June 13, 1950     J. A. RAWLINS     2,511,543
GAS LUBRICATED BEARING
Filed Oct. 5, 1945     4 Sheets-Sheet 1
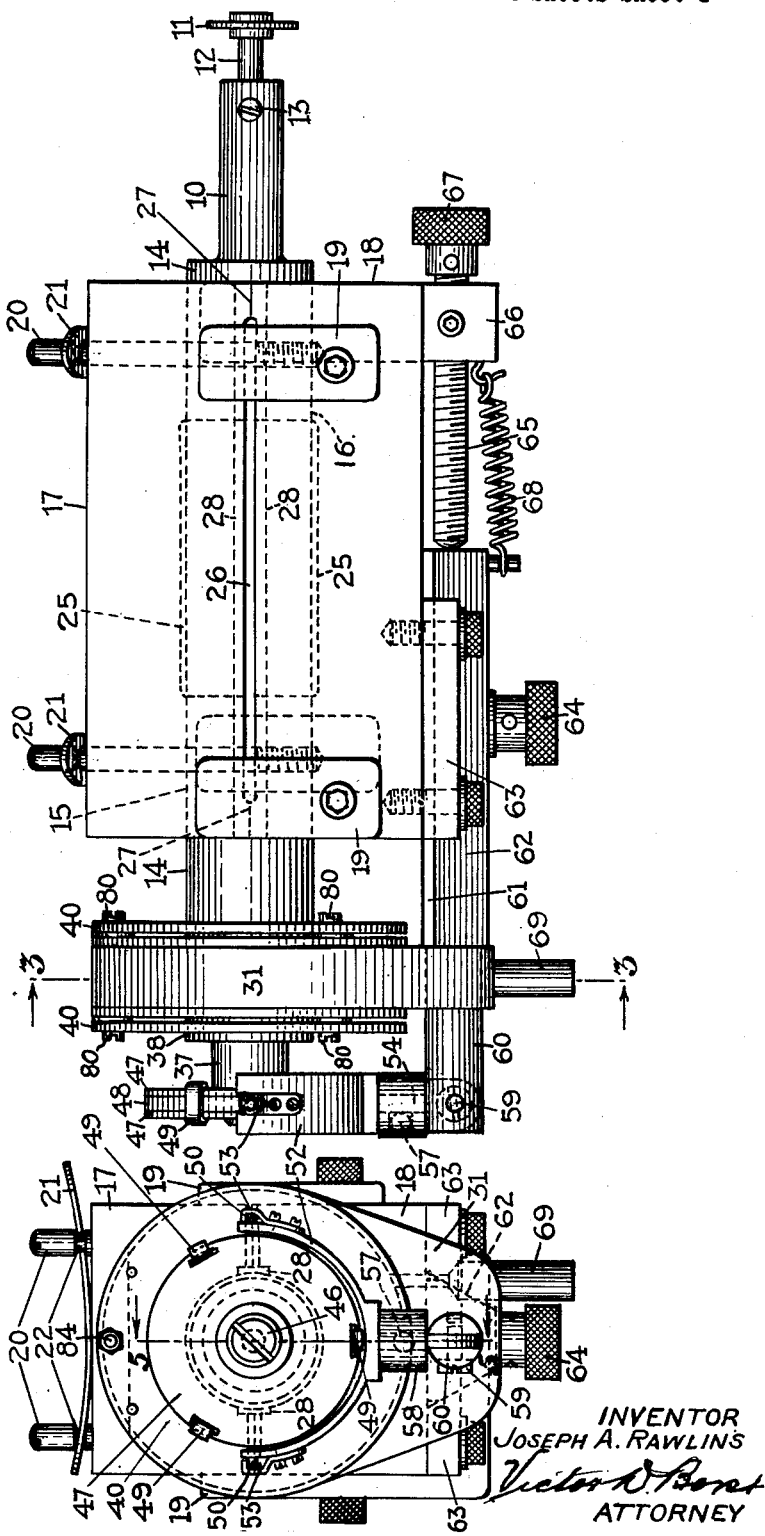
INVENTOR
JOSEPH A. RAWLINS
ATTORNEY

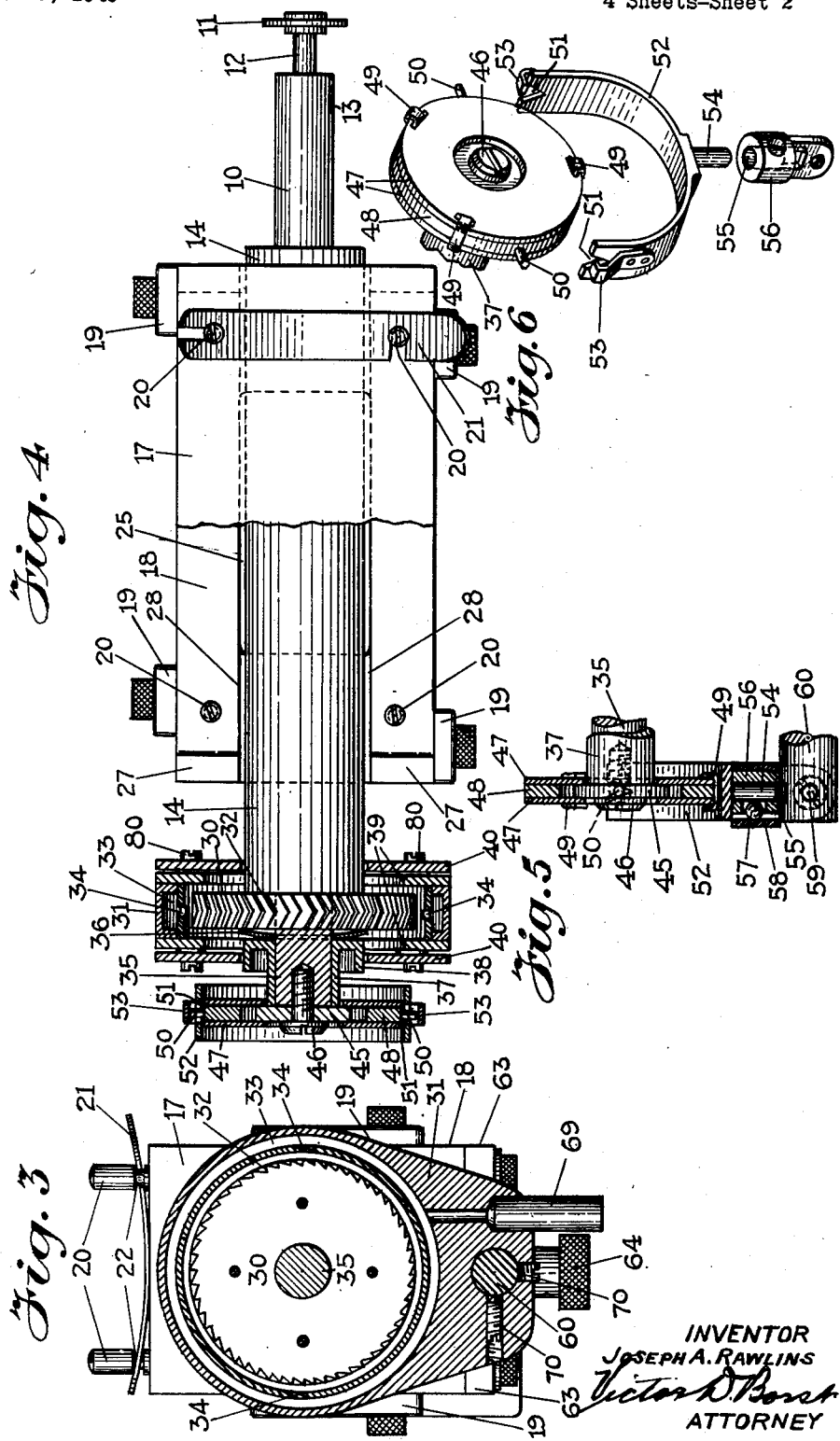

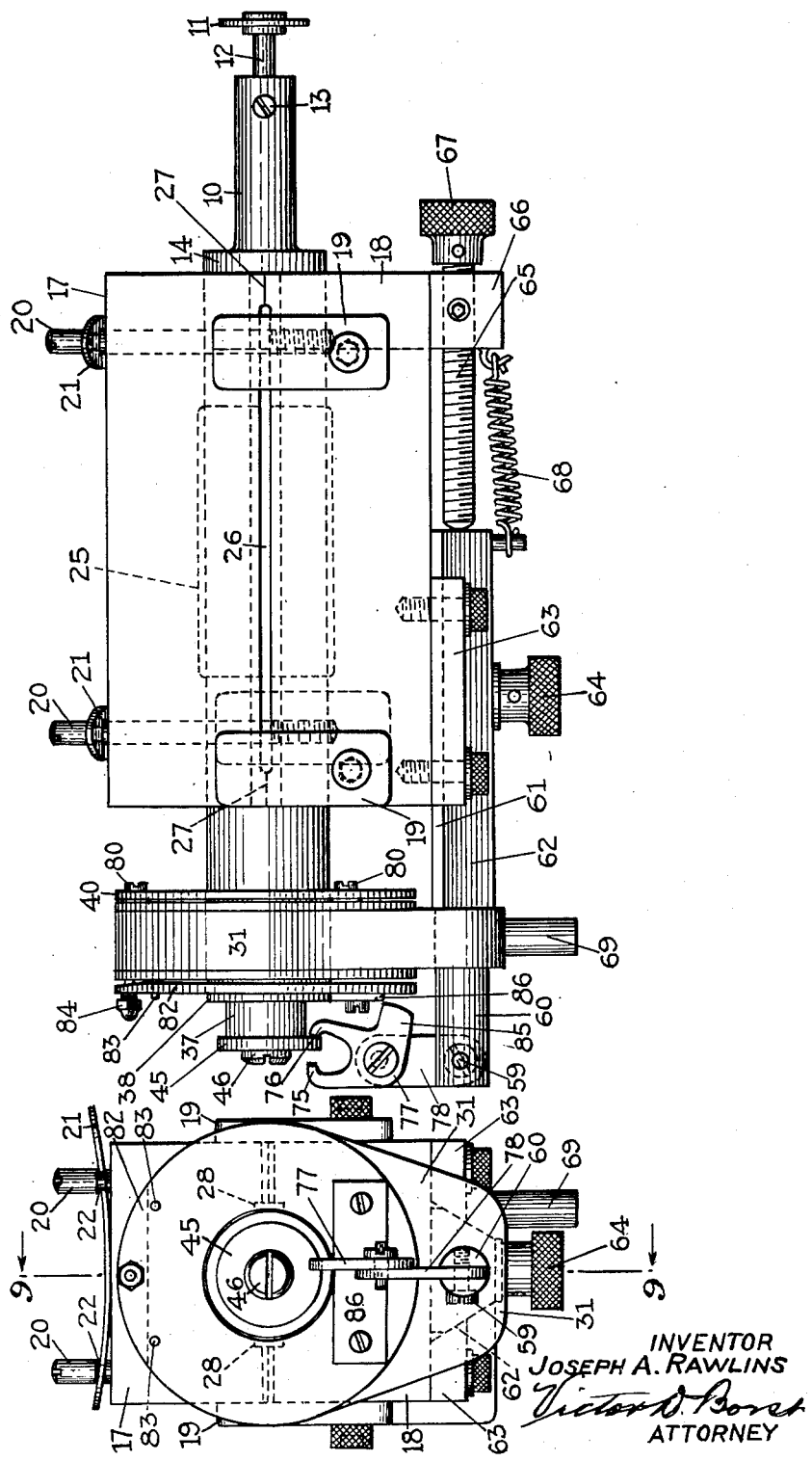

June 13, 1950   J. A. RAWLINS   2,511,543
GAS LUBRICATED BEARING
Filed Oct. 5, 1945   4 Sheets-Sheet 4
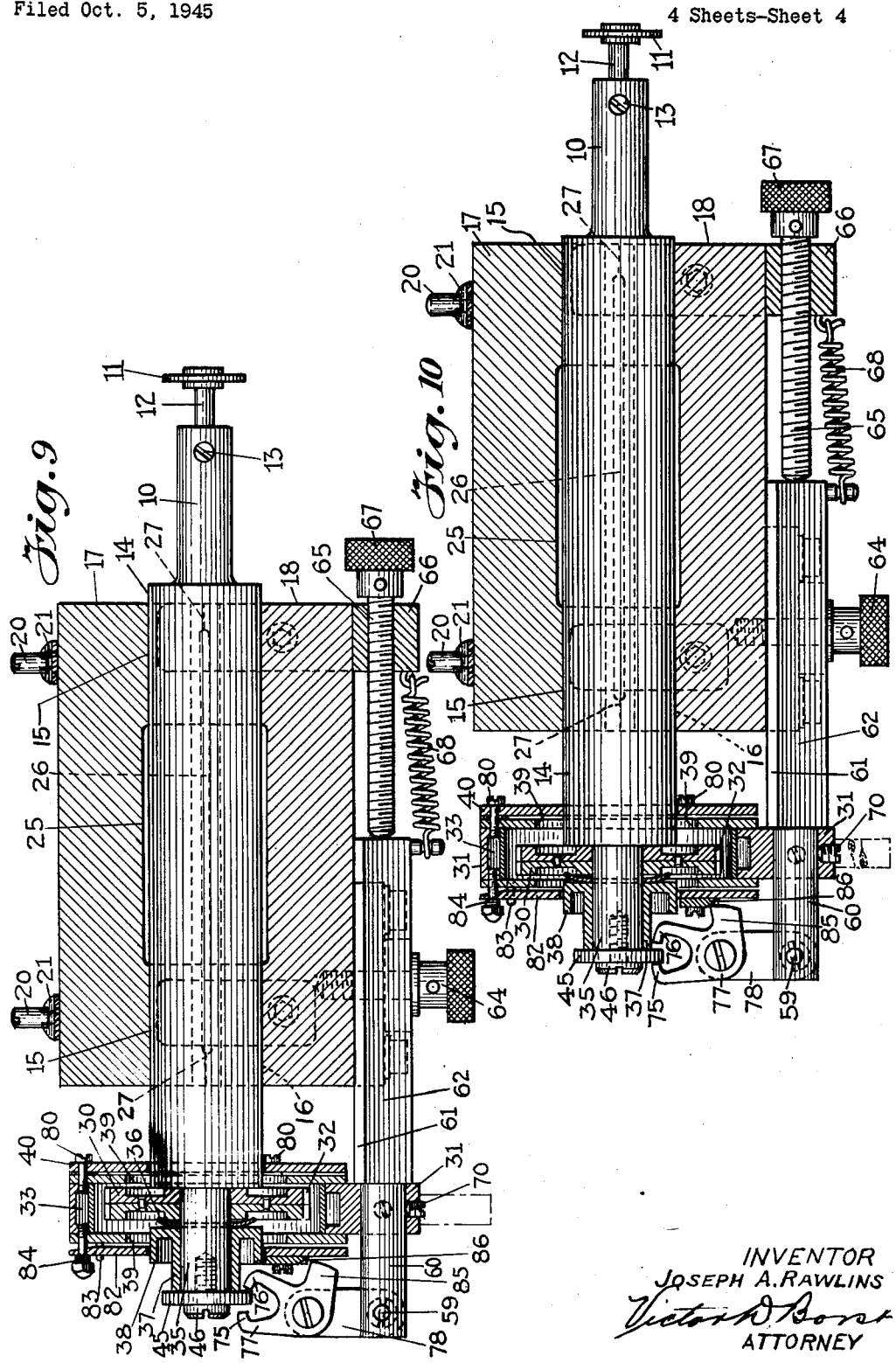
INVENTOR
JOSEPH A. RAWLINS
ATTORNEY Patented June 13, 1950

2,511,543

UNITED STATES PATENT OFFICE 2,511,543

GAS-LUBRICATED BEARING

Joseph A. Rawlins, Tenafly, N. J., assignor to The Sperry Corporation, a corporation of Delaware Application October 5, 1945, Serial No. 620,523

2 Claims. (Cl. 308—9)

This invention relates to gas lubricated bearings and more particularly to bearings which are lubricated by air or other gas under a pressure developed by relative movement of the bearing parts.

An object of the invention is to provide a bearing of the above type having novel and improved operating characteristics.

Another object is to provide a bearing having extremely small clearance for accurately positioning the rotating shaft both radially and axially.

Another object is to provide a bearing for high speed spindles which absorbs a minimum amount of power.

Various other objects and advantages will be apparent as the nature of the invention is more fully disclosed.

The present invention is particularly applicable to spindles for high speed tools such as small diameter grinding wheels which may operate at speeds of the order of 50,000 R. P. M. The bearing may have a clearance of the order of .0001 inch so as to position the tool accurately and cause it to operate without wabble or side play.

It has been found that bearings of the above type have a tendency to bind after an interval of time. This may be due to fine particles which are drawn in with the air and become wedged between the bearing surfaces or may be due to other causes. The present invention overcomes this difficulty and provides a bearing which is capable of operating indefinitely without binding or undue increase in temperature.

This is accomplished by the expedient of making the stationary block in two or more parts which are held by spring pressure so as to be movable to increase the clearance in response to suitable pressures in the bearing. Any particles are thus automatically passed through the bearing without causing the same to bind and also excessive pressures are prevented from developing which cause particles to become imbedded in the bearing surfaces with resultant scoring thereof.

The invention also provides a simple and efficient means for oscillating the spindle in an axial direction.

Although the novel features which are believed to be characteristic of this invention are pointed out more particularly in the claims appended hereto, the invention itself may be better understood by referring to the following description taken in connection with the accompanying drawings in which specific embodiments thereof have been set forth for purposes of illustration.

In the drawings:

Fig. 1 is an end elevation of an air-lubricated spindle embodying the present invention;

Fig. 2 is a side elevation thereof;

Fig. 3 is a transverse section taken on the line 3—3 of Fig. 2;

Fig. 4 is a top plan view of the air-lubricated spindle with parts broken away to show the construction thereof;

Fig. 5 is a detail view showing the support of the thrust bearing;

Fig. 6 is an exploded view of parts of the thrust bearing support;

Fig. 7 is an end elevation of an air-lubricated spindle illustrating a further embodiment of the invention, including mechanism for causing axial oscillation of the spindle;

Fig. 8 is a side elevation of the spindle of Fig. 7;

Fig. 9 is a vertical longitudinal section thereof taken on the line 9—9 of Fig. 7; and Fig. 10 is a section similar to Fig. 9 but showing the spindle in a different axial position.

Referring first to Figs. 1 to 6, the invention is shown as applied to a spindle 10 carrying a tool, shown as a grinding disc 11, mounted on a shank 12 which is secured to the spindle 10 by suitable means shown as a set screw 13. The spindle 10 is provided with an enlarged cylindrical bearing section 14 which is journalled in bearing surfaces 15 and 16 formed in upper and lower bearing blocks 17 and 18, respectively.

The lower bearing block 18 constitutes a fixed support and is mounted by any suitable means not shown. The upper bearing block 17 is accurately positioned transversely of the lower bearing block 18 between clips 19. Studs 20 are secured in the lower bearing block 18 and extend through holes in the upper bearing block 17 so as to position the upper bearing block axially relative to the lower block and to allow vertical movement of the upper block. The upper bearing block 17 is yieldably held against the lower bearing block 18 by means of slotted leaf springs 21 which engage grooves 22 in the studs 20.

The bearing blocks 17 and 18 are formed with cylindrical chambers 25 extending axially of the blocks between the bearing surfaces 15 and 16. The radius of the chambers 25 is such as to provide substantial clearance for the bearing section 14 of the spindle. Horizontal slots 26, formed half and half in the two bearing blocks, extend from the chambers 25 to the outside of the blocks to form shoulders 27. The shoulders 27 form the contacting surfaces for the two bearing blocks and are accurately finished to determine the minimum bearing clearance. As above stated, the clearance between the bearing section 14 and the bearing surfaces 15 and 16 is of the order of .0001 inch when the shoulders 27 are in contact. This clearance, however, is permitted to be increased by separating the bearing blocks 17 and 18 against the pressure of the springs 21.

Axial channels 28 are formed half and half in the bearing blocks 17 and 18 along the parting line so that the bearing surfaces 15 and 16 are removed for a short distance each side of the parting line.

The spindle 10 is shown as rotated by an air turbine comprising a rotor 30 enclosed in a housing 31 and having suitable driving vanes 32. The housing 31 includes an air chamber 33 and admission ports 34 by which air is supplied to the vanes 32 in the usual manner for causing rotation of the rotor. The rotor 30 is mounted upon an extension 35 of the spindle 10 which is of reduced section, and is frictionally held against the enlarged bearing section 14 by means of a spring 36. An annular sleeve 37 is mounted on the extension 35 of the spindle and has an annular rim 38 which is of the same diameter as the bearing section 14. Air is discharged from the turbine through openings 39 formed in the housing 31 around the rim 38 and around the bearing section 14. Baffle plates 40 are spaced from the two sides of the housing 31 in a manner to equalize the exhaust air pressure on the two sides of the rotor.

An end thrust bearing is formed by a disc 45 which is attached to the end of the extension 35 by means of a screw 46. The disc 45 runs between stationary annular plates 47 which are yieldably secured on opposite sides of a ring 48 by means of spring clips 49. The ring 48 is provided with diametrically opposite trunnions 50 which are supported in V-slots 51 in a yoke 52 and are secured against removal by spring clips 53. The yoke 52 is provided with a radially extending pin 54 which is journaled in a recess 55 in a block 56 and is frictionally secured by a ball 57 which is held against the pin 54 by means of a split cylindrical spring clip 58. The block 56 is secured by a screw 59 to an arm 60 which is carried by a slide 61. The slide 61 is provided with inclined surfaces 62 which are slidably held in gibs 63 to permit axial adjustment. The slide 61 is secured in adjusted position by means of a clamping screw 64. The slide 61 is mounted for adjustment by means of an adjusting screw 65 which is threaded in a bracket 66 formed as a part of the lower bearing block 18 and is adjusted by a hand knob 67. A spring 68 holds the slide 61 against the end of the screw 65. The slide 61 also carries the housing 31 of the air turbine. The housing is secured to the arm 60 of the slide by set screws 70. Compressed air is supplied to the turbine through a duct 69.

In the operation of this device the spindle 10 is rotated by the compressed air turbine in a manner which will be readily understood. The lubricant for the bearing surfaces 15 and 16 constitutes air which is compressed between the bearing surfaces 15 and 16 and the bearing section 14 of the spindle 10 due solely to the relative rotation of the parts. The air is accordingly maintained at a pressure which is above that of the surrounding atmosphere due solely to the rotation of the parts themselves.

As above pointed out the clearance between the bearing surfaces 15 and 16 and the bearing section 14 of the spindle is extremely small such as of the order of .0001 inch, hence any foreign particles which might be drawn in from the surrounding atmosphere would tend to interfere seriously with the operation of the spindle. In the construction disclosed, however, the spring mounting for the upper bearing block permits sufficient relative radial movement of this bearing block to permit any such particles to pass through and to relieve any excess pressures which would force the particles into the bearing surfaces. The elimination of the bearing surfaces axially along the parting line between the bearing blocks by channels 28 obviates the necessity of providing yieldable support for the bearing surfaces 15 and 16 along this diameter. Although bearing blocks made in two sections are entirely satisfactory for most uses, it is apparent that the bearing block may be made in three or more sections if necessary.

It has been found that with this construction, the operation is extremely stable. The rotation of the grinding disc 11 is controlled accurately for precision grinding purposes inasmuch as the bearing clearance is so small that no appreciable side play can take place. It has been found that the device may be operated indefinitely at extremely high speed without developing more than a few degrees rise in temperature and in tests it has been found that if abrasive particles which are in the surrounding air are drawn into the bearing they pass freely through without injury thereto.

The thickness of the ring 48 is such that the clearance between the disc 45 and the annular plates 47 is of the same order as that between the spindle and the bearings surfaces 15 and 16. The thrust bearing thus produced is lubricated by air which is compressed by rotation of the parts in the same manner as the cylindrical bearings above described. The thrust bearing thus positions the grinding wheel accurately in an axial direction.

It is noted that the spring clips 49 permit relative movement of the annular members 47 comparable to the movement of the upper bearing block 17 which is permitted by the springs 21. Hence the thrust bearing is likewise prevented from being clogged or injured by the passage of fine particles therethrough. The thrust bearing is self-aligning due to the pivotal movement of the ring 48 about the trunnions 50 and the pivotal movement of the yoke 52 about the axis of the pin 54. The ring 48 and the plates 47 are thus mounted for universal movement so that they are self-aligning with the disc 45.

Inasmuch as the bearing section 14 of the spindle 10 is longer than the bearing blocks 17 and 18, the spindle may be axially adjusted by means of the adjusting screw 65 which positions the slide 61 carrying the housing 31 of the air turbine and the thrust bearing.

The embodiment of Figs. 7 to 10 is generally similar to that above described and the similar parts have been given corresponding reference characters. In this embodiment, however, the thrust bearing is removed and the disc 45 is engaged by fingers 75 and 76 of a yoke 77 which is pivoted on a bracket 78 carried by the arm 60. In this embodiment one of the plates 40 is shown as rigidly secured by screws 80 to the housing 31 the same as in Fig. 4. The other plate 40 however is replaced by a plate 82 which is loosely held on pins 83 and is hung from a supporting pin 84 so that the plate 82 may pivot about the pin 84 and allow the lower portion of the plate to approach or recede from the housing 31.

The position of this lower portion of the plate 82 is controlled by an arm 85 carried by the yoke 77 and engaging a cam plate 86 attached to the plate 82 and arranged so that when the spindle 10 is moved to the right as shown in Figs. 8 and 9 the disc 45 engages the finger 76 of the yoke 77 and causes pivotal movement of the yoke which retracts the arm 85 from the cam 86 and leaves the plate 82 free to swing away from the housing 31. When the spindle 10 is in its lefthand position as shown in Fig. 10, the disc 45 engages the finger 75 of the yoke and causes pivotal movement of the yoke to bring the arm 85 into engagement with the cam plate 86 thereby forcing the plate 82 toward the housing 31. The arrangement is such that with the plate 82 in the position shown in Fig. 10 the clearance between the plate 82 and the housing 31 is less than the clearance between the stationary plate 40 and the housing 31, but with the plate 82 released as shown in Figs. 8 and 9 the clearance between the plate 82 and the housing 31 is greater than that between the stationary plate 40 and the housing 31.

In the operation of this embodiment, the air pressure on the two sides of the rotor 30 is controlled by the clearance between the plates 40 and 82 respectively and the housing 31 because the air discharged from the turbine passes outwardly through the openings 39 and then is exhausted to atmosphere through the passages between the plates 40 and 82 respectively and the housing 31, and is also exhausted between the plates 40 and 82 and the surface of the bearing section 14 and of the rim 38. When these clearances are equal the air pressure on the two sides of the rotor are equalized and the rotor remains in a central position as shown for example in Fig. 4. However, when the plate 82 is released as in Figs. 8 and 9 the pressure on the lefthand side of the rotor becomes less than the pressure on the righthand side of the rotor and the latter is driven by this pressure differential toward the lefthand side of the housing 31 into the position shown in Fig. 10.

When this position is reached, the arm 85 is actuated to engage cam 86 and shift the plate 82 toward the housing 31 so that the clearance between the plate 82 and the housing 31 becomes less than that between the plate 40 and the housing 31. Air pressure is thus built up on the lefthand side of the rotor which causes the rotor to shift axially to the righthand side of the housing into the position indicated in Fig. 9. In that position the arm 85 is again actuated to release the plate 82 and the operation is repeated.

The turbine rotor 30 and the spindle 10 are thus caused to oscillate in an axial direction. Such axial operation of the grinding disc 11 may be useful for example in polishing or grinding surfaces to a smooth finish where it is desired to avoid any marks which might otherwise be produced by the grinding wheel itself.

Although certain specific embodiments of the invention have been shown for purposes of illustration, it is to be understood that the invention is capable of various uses and that changes and adaptations may be made therein as will be readily apparent to a person skilled in the art. The invention is only to be restricted in accordance with the scope of the following claims.

What is claimed is:

1. A gas-lubricated bearing, comprising a high speed rotary spindle having a cylindrical bearing surface, a split bearing block comprising a plurality of members having bearing surfaces normally closely spaced from said cylindrical surface by an amount such that the bearing is lubricated solely by air pressure produced by the relative rotary movement of the bearing surfaces, and yieldable means mounting the members of said split block for relative separating movement to permit the normal spacing of said bearing surfaces to increase in response to air pressure developed therebetween, and axial channels formed in the bearing blocks on opposite sides of the split line to provide clearance with the spindle at diametrically opposite sides.

2. A gas-lubricated bearing comprising a high speed rotary spindle having a cylindrical bearing surface, a split bearing block comprising a plurality of members having bearing surfaces normally closely spaced from said cylindrical surface by an amount such that the bearing is lubricated solely by air pressure produced by the relative rotary movement of the bearing surfaces and spring means arranged to hold the members of said split bearing block in the normal spaced position but to permit relative separating movement of the members to increase the normal spacing of said bearing surfaces in response to air pressure developed therebetween, and axial channels formed in the bearing blocks on opposite sides of the split line to provide clearance with the spindle at diametrically opposite sides.

JOSEPH A. RAWLINS.

REFERENCES CITED

The following references are of record in the file of this patent:

UNITED STATES PATENTS

| Number | Name | Date |
|---|---|---|
| 466,622 | Orenstein | Jan. 5, 1892 |
| 468,043 | Hultgren | Feb. 2, 1892 |
| 655,633 | Lee et al. | Aug. 7, 1900 |
| 676,471 | Pessano | June 18, 1901 |
| 976,144 | Boyer | Nov. 22, 1910 |
| 1,270,808 | Franklin | July 2, 1918 |
| 1,313,842 | Tridico | Aug. 19, 1919 |

FOREIGN PATENTS

| Number | Country | Date |
|---|---|---|
| 632,792 | France | 1927 |